United States Patent [19]
Sugimoto et al.

[11] Patent Number: 5,351,503
[45] Date of Patent: Oct. 4, 1994

[54] REFRIGERATING APPARATUS WITH DUAL BLOWERS AND EVAPORATORS FOR USE IN TRANSPORTATION

[75] Inventors: Tamio Sugimoto; Masashi Sekoguchi, both of Nishi-Kasugai-gun, Japan

[73] Assignee: Mitsubishi Jukogyo Kabushiki Kaisha, Tokyo, Japan

[21] Appl. No.: 44,073

[22] Filed: Apr. 8, 1993

[30] Foreign Application Priority Data

Apr. 13, 1992 [JP] Japan ................... 4-092792

[51] Int. Cl.$^5$ ............................... F25D 17/06
[52] U.S. Cl. ........................ 62/429; 62/323.3
[58] Field of Search ............... 62/429, 427, 426, 428, 62/177, 178, 179, 186, 239, 323.3

[56] References Cited

U.S. PATENT DOCUMENTS

| | | | |
|---|---|---|---|
| 1,942,295 | 1/1934 | Kerr, Jr. et al. | 62/429 |
| 2,518,284 | 8/1950 | Clark | 62/429 |
| 2,569,009 | 9/1951 | Kuempel | 62/429 |

*Primary Examiner*—John M. Sollecito
*Attorney, Agent, or Firm*—Wenderoth, Lind & Ponack

[57] ABSTRACT

In a refrigerating apparatus for use in transportation, condenser fans for feeding external air to a condenser and evaporator fans for feeding air in a freezer compartment to an evaporator are mounted on a common shaft driven by an engine. The condenser fans and evaporator fans have propellers of the same size. The common drive shaft is disposed parallel to a drive shaft of the engine.

7 Claims, 5 Drawing Sheets

REFRIGERATING APPARATUS WITH DUAL BLOWERS AND EVAPORATORS FOR USE IN TRANSPORTATION

BACKGROUND OF THE INVENTION

1. Field of the Invention

The present invention relate to a refrigerating apparatus for use in transportation, and more particularly to such refrigerating apparatus in which a compressor is driven by an engine, and a condenser fan for feeding external air to a condenser and an evaporator fan for feeding air in a freezing chamber to an evaporator are driven by the same engine.

2. Description of the Prior Art

One example of a refrigerating apparatus for use in transportation in the prior art is illustrated in FIGS. 4 and 5. This apparatus has a so-called nose mount shape, which means that it is mounted to the outside of a front wall 13a of a freezer compartment 13 of a vehicle. The interior of a main body 20 of this refrigerating apparatus is partitioned into a machine housing 21, and an outdoor side airflow passageway 22 and an indoor side airflow passageway 25. In the machine housing 21 are disposed an engine 1, a compressor (not shown) which is driven by this engine 1, and an electric motor 2 for driving the compressor with a commercial power source. In the outdoor side airflow passageway 22 are disposed a condenser 7 and a propeller type of condenser fan 8 for feeding external air to this condenser 7. An intake opening 23 through which external air is led to the condenser 7 and an exhaust opening (not shown) through which air flowing past the condenser 7 is discharged are defined on a side of the main body 20. In the indoor side airflow passageway 25 are disposed an evaporator 11, and a turbo type of evaporator fan 12 for feeding air in the freezer compartment to the evaporator 11. Also, a guide plate 26 leads air in the freezer compartment to the evaporator 11, and a blow-out opening 28 allows air having passed the evaporator 11 to blow into the freezer compartment.

As shown in FIG. 5, the condenser fan 8 and the evaporator fan 12 are connected via a common drive shaft arranged in the direction perpendicular to the drive shaft of the engine 1, and they are driven by a belt via an electric motor 2 for transmitting power from the engine 1. The direction of the belt is changed and adjusted by means of a large number of pulleys disposed at various locations in the main body of the apparatus. In the outdoor side airflow passageway 22, external air sucked through the intake opening 23 by the condenser fan 8 absorbs heat from the refrigerant flowing through the condenser 7, and thus condenses and liquefies the refrigerant, and thereafter is discharged through the exhaust opening.

On the other hand, in the indoor side airflow passageway 25, air in the freezer compartment forced along the guide plate 26 by the evaporator fan 12 is cooled by delivering heat to a refrigerant flowing through the evaporator 11, and is blown out as a cold airflow through the blow-out opening 28 into the freezer compartment.

In the above-described refrigerating apparatus for use in transportation in the prior art, because of the fact that different types of fans are used for insuring a sufficient airflow to the condenser 7 and the evaporator 11, that is, because the condenser fan 8 consists of a large propeller type of fan and the evaporator fan 12 consists of a turbo type of fan, the manufacturing cost of the apparatus is high.

In addition, because the drive shafts of the condenser fan 8 and the evaporator fan 12 are disposed perpendicularly to the drive shaft of the engine 1, transmitting power from the engine 1 involves changing the direction of the rotary output of the motor and so the transmission must have a complicated structure.

SUMMARY OF THE INVENTION

It is therefore one object of the present invention to provide an improved refrigerating apparatus for use in transportation, which is free from the above-mentioned shortcomings in the prior art.

A more specific object of the present invention is to provide a refrigerating apparatus for use in transportation, in which a condenser fan and an evaporator fan are of the same size and type and are also small, whereby the apparatus may be manufactured at a low cost.

Another specific object of the present invention is to provide a refrigerating apparatus for use in transportation, in which in the system for transmitting power to drive the fans has a simple structure.

To achieve these objects the present invention provides a refrigerating apparatus for use in transportation comprising a compressor driven by an engine, a condenser fan for feeding external air to a condenser and an evaporator fan for feeding air in a freezer compartment to an evaporator driven by the engine, the condenser fan and the evaporator fan comprising propellers of the same size connected by a common drive shaft, and the drive shaft extending parallel to a drive shaft of the engine.

Due to the fact that propellers of the same size are used as the condenser fan and the evaporator fan, a sufficient airflow to the condenser and the evaporator can be insured.

In addition, due to the fact that the common drive shaft connecting the condenser fan and the evaporator fan is parallel to the drive shaft of the engine, it is unnecessary to change the direction of the rotary output of the engine.

The above-mentioned and other objects, features and advantages of the present invention will become more apparent by referring to the following description of one preferred embodiment of the present invention made in conjunction with the accompanying drawings.

DETAILED DESCRIPTION OF THE PREFERRED EMBODIMENT

Figure 1:
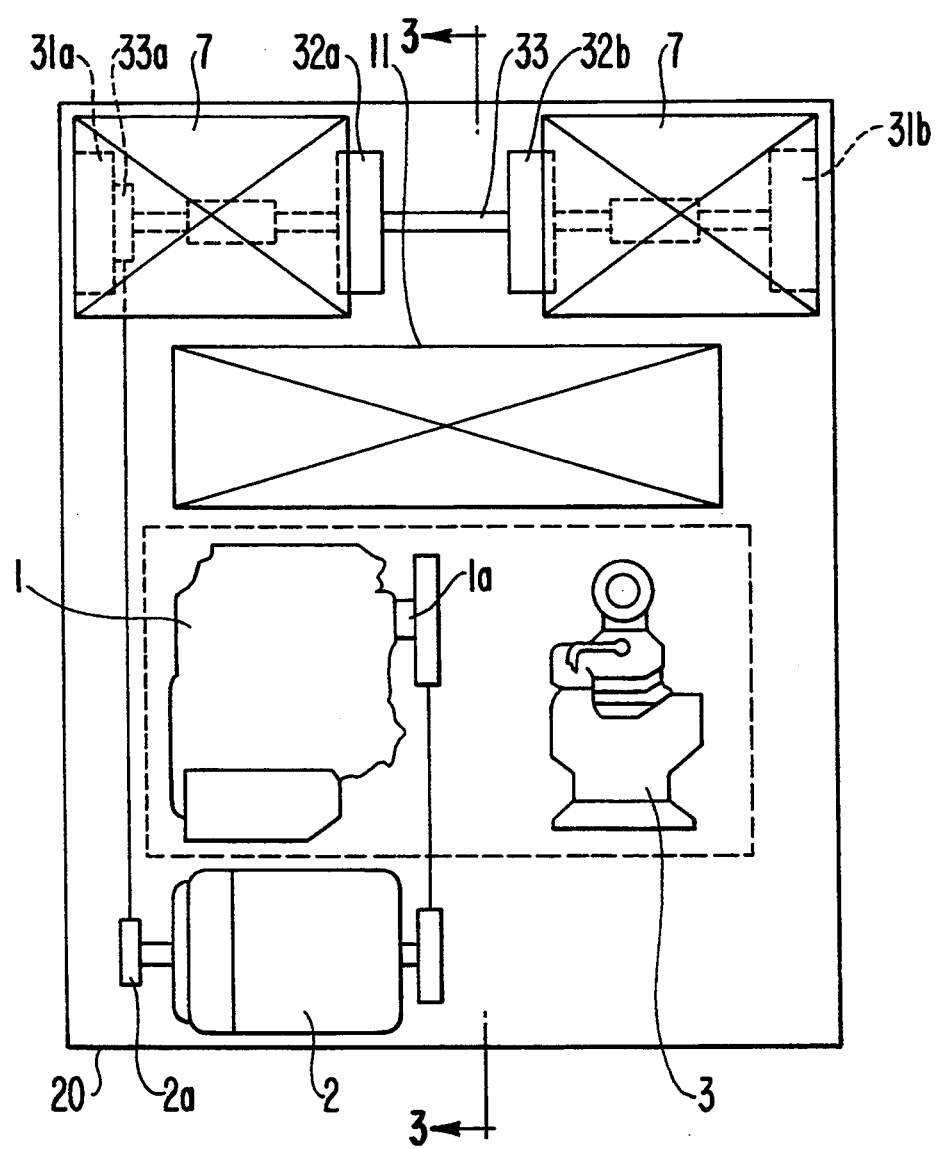
FIG. 1 is a front view of internal structure of one preferred embodiment of a refrigerating apparatus for use in transportation according to the present invention.
Figure 2:
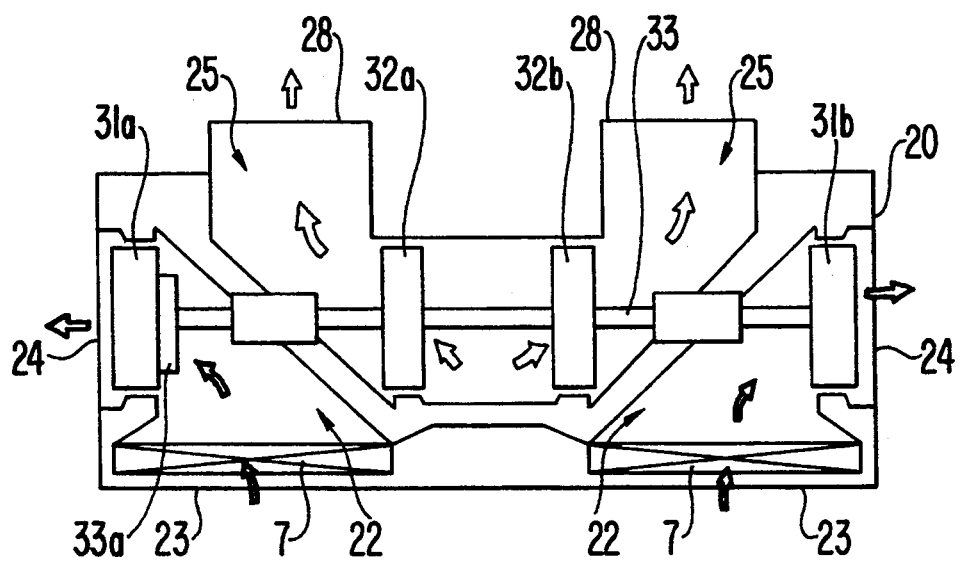
FIG. 2 is a plan view of the internal structure of the same preferred embodiment.
Figure 3:
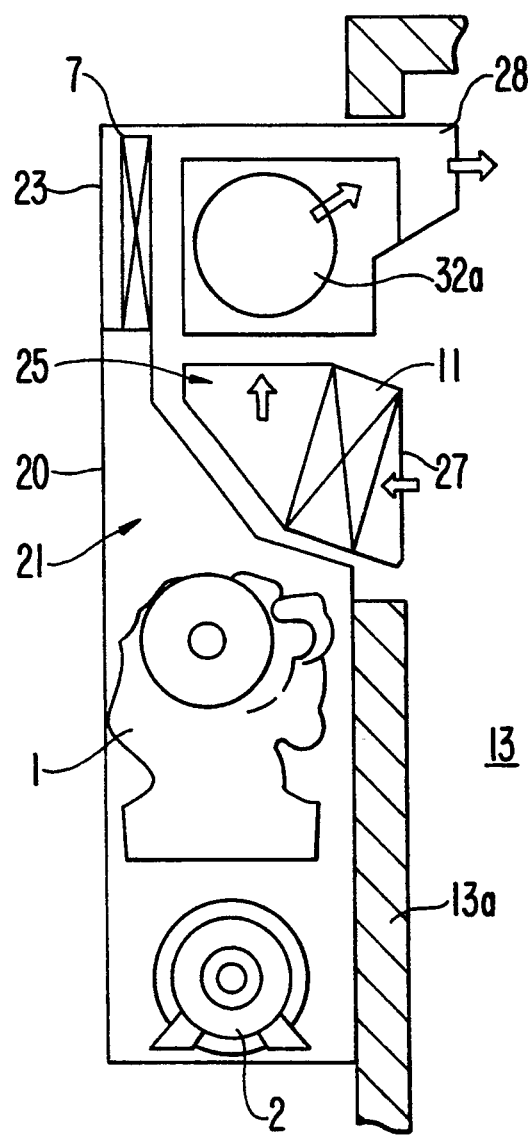
FIG. 3 is a cross-sectional view of the same taken along line 3—3 in FIG. 1 as viewed in the direction of arrows.
Figure 4:
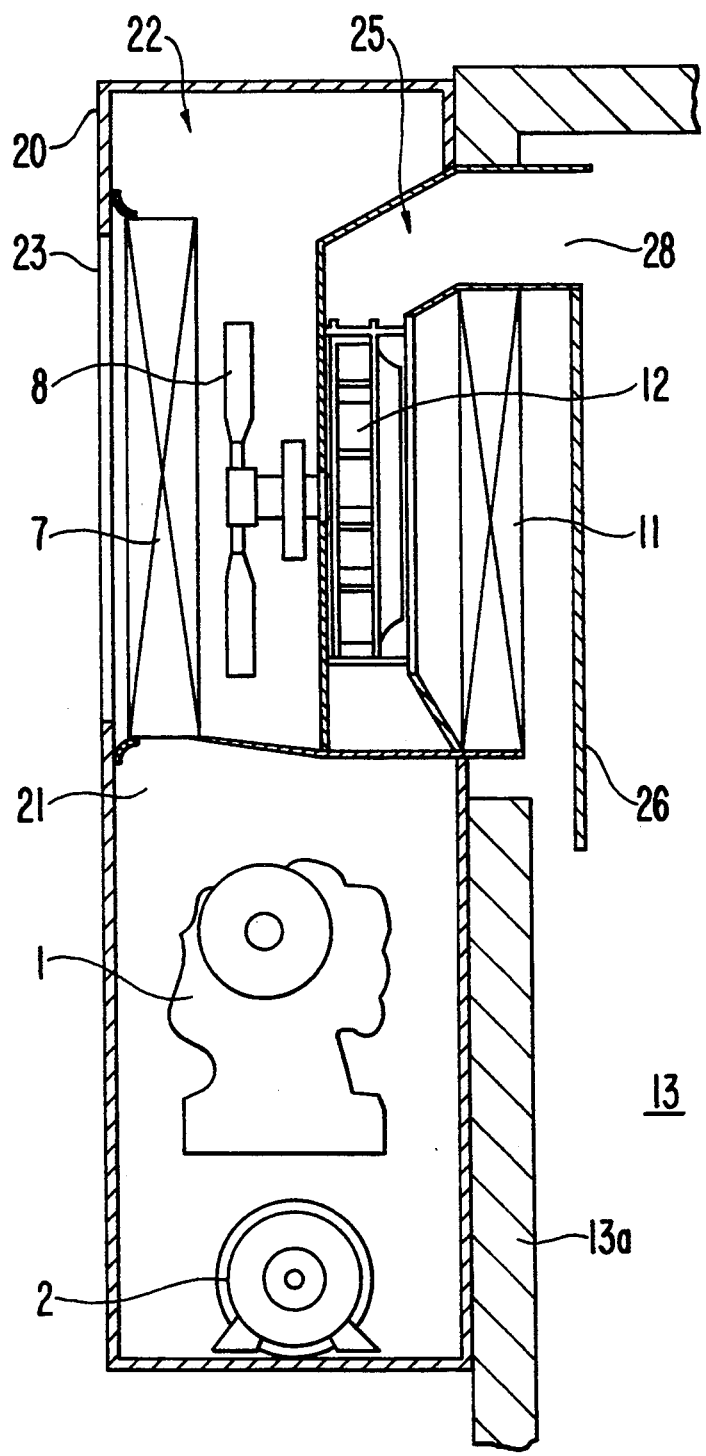
FIG. 4 is a vertical cross-sectional view of one example of a refrigerating apparatus for use in transportation in the prior art.
Figure 5:
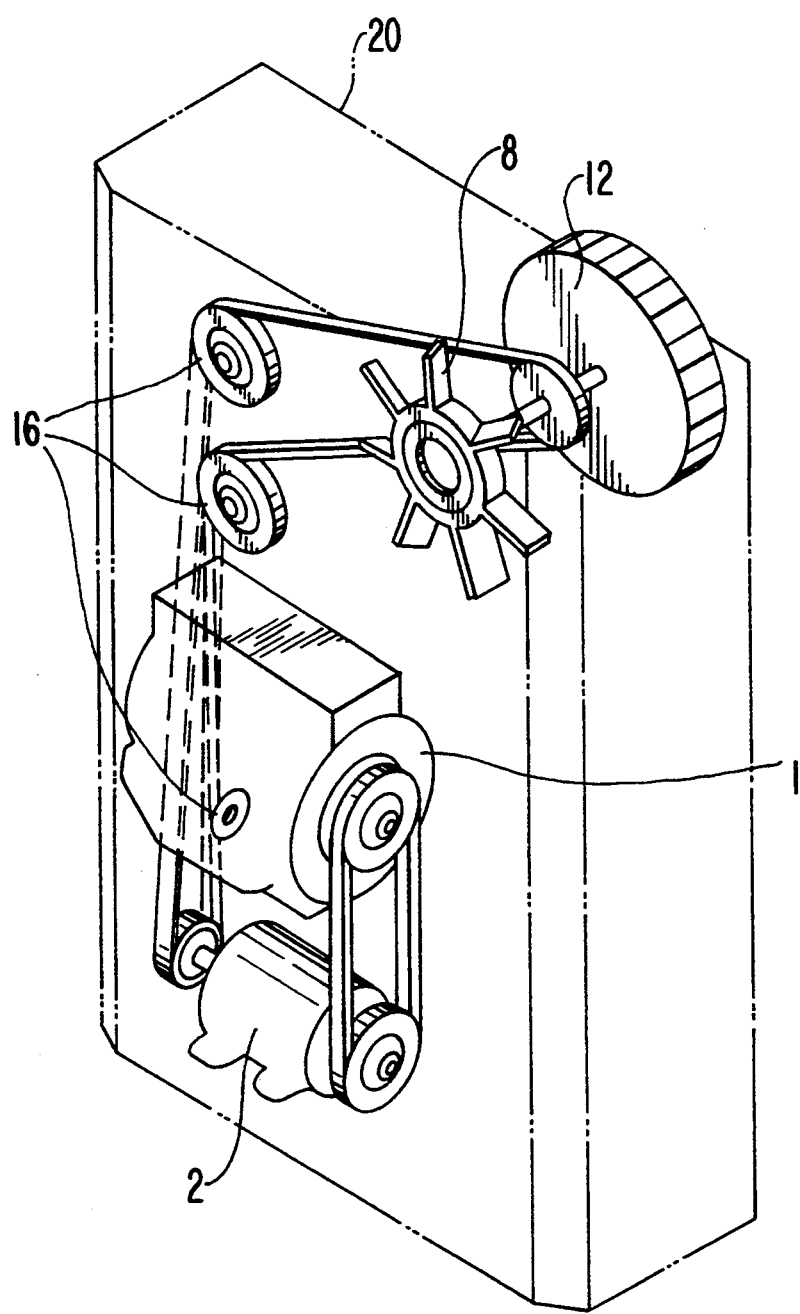
FIG. 5 is a perspective view of the internal structure of the refrigerating apparatus shown in FIG. 4.

Now the refrigerating apparatus for use in transportation according to the present invention will be described in greater detail in connection with one preferred embodiment thereof shown in FIGS. 1 to 3.

In these figures, reference numeral 13 designates a freezer compartment, numeral 13a designates a front wall of the same, numeral 20 designates a main body of a refrigerating apparatus mounted to the outside of the front wall 13a, numeral 21 designates a machine housing provided at a lower level portion of the main body, numeral 25 designates an indoor side airflow passageway extending from a mid-level portion to an upper level portion of the main body, numeral 22 designates an outdoor side airflow passageway provided in the upper level portion of the same main body, numeral 1 designates an engine provided within the machine housing 21, numeral 2 designates an electric motor provided within the machine housing 21, numeral 3 designates a compressor provided within the machine housing 21, numeral 11 designates an evaporator provided in the indoor side airflow passageway 25, and numeral 7 designates condensers (also referred to as condenser portions of the apparatus) provided in the left- and right-hand portions of the outdoor side airflow passageway, respectively.

In addition, reference numerals 31a and 31b designate condenser fans provided in the outdoor side airflow passageway 22, numerals 32a and 32b designate evaporator fans provided in the indoor side airflow passage 25, and these fans are all propeller types of fans. Reference numeral 33 designates a drive shaft common to the fans 31a, 31b, 32a and 32b, and since the respective fans are rotated in the same direction by this drive shaft, the fans 31 and 31b have their blades twisted in opposite directions to each other, and the fans 32a and 32b have their blades twisted in opposite direction to each other. These four fans differ only in the direction of twist of their blades and have the same size.

Reference numeral 1a designates a drive shaft of the engine 1, numeral 2a designates a motor pulley of the electric motor 2, and numeral 33a designates a fan pulley associated with the drive shaft 33. The drive shaft 33 of the fans, the drive shaft 1a of the engine and the drive shafts of the electric motor are parallel to one another, and belts are wound around the respective pulleys so that power of the engine 1 is relayed by the electric motor 2 to drive the driven shaft 22 of the fans whereby the fans are rotated.

In the illustrated apparatus, when the engine 1 is started, the compressor 3 is driven via a driving route schematically illustrated by the dashed line. Also, power of the engine 1 is transmitted to the drive shaft 33, whereby the condenser fans 31a and 31b and the evaporator fans 32a and 32b are rotated. Then, in the outdoor side airflow passageway 22, external air sucked through intake openings 23 is discharged to the outside through exhaust openings 24 after it has flowed past the condensers 7 as shown by black bold arrows. On the other hand, in the indoor side airflow passageway 25, air in the freezing chamber sucked through suction openings 27 is blown out into the freezer compartment after it has flowed past the evaporator 11 as shown by white bold arrows. In the illustrated apparatus, owing to the fact that propeller types of fans of the same size are used as the condenser fans 31a and 31b and the evaporator fans 32a and 32b, sufficient flow rates of the airflows passing the condensers 7 and the evaporator 11 can be insured. Consequently, the sizes of the fans 31a, 31b, 32a and 32b can be small. Hence, the depth of the main body 20 can be maintained at a minimum- Further, the use of the same type of fan for both the condenser and evaporator fan helps to keep the manufacturing costs down.

In addition, as a result of the fact that the common drive shaft 33 for connecting the condenser fans 31a and 31b and the evaporator fans 32a and 32b extends parallel to the drive shaft 1a of the engine 1, changing the orientation of the rotary direction of the engine output is unnecessary. Hence, the transmission coupling the engine to the common drive shaft of the fans can be simple, thereby also helping to keep the manufacturing costs down.

Although a refrigerating apparatus for use in transportation according to the present invention has been described in detail above on the basis of one preferred embodiment illustrated in the accompanying drawings, various changes and modifications will become readily apparent to those skilled in the art. For instance, although the illustrated apparatus comprises an engine and an electric motor so that either one of the engine and the electric motor can be used for driving the compressor, condenser fans and evaporator fans, the apparatus may have an engine only.

All such changes and modifications are seen to be within the true spirit and scope of the present invention as defined by the appended claims.

What is claimed is:

1. A refrigerating apparatus comprising:
    a main body mounted to a freezer compartment, said main body having an interior partitioned into an outdoor side air flow passageway open to the environment outside of the main body, and an indoor side air flow passageway open to the freezer compartment, said outdoor side air flow passageway and said indoor side air flow passageway having respective portions juxtaposed in a widthwise direction of the main body;
    a condenser disposed in said main body within said outdoor side air flow passageway;
    an evaporator disposed in said main body within said indoor side air flow passageway;
    a compressor;
    an engine disposed in said main body, said engine being operatively connected to said compressor so as to drive the compressor, and said engine having an output shaft at which the power of the engine is output;
    one drive shaft rotatably supported and disposed within said main body, said one drive shaft extending across said outdoor side air flow passageway and said indoor side air flow passageway parallel to the output shaft of said engine;
    a transmission operatively connecting the output shaft of said engine to said one drive shaft;
    two condenser fans each comprising a propeller mounted to said one drive shaft in said outdoor side air flow passageway; and
    two evaporator fans each comprising a propeller mounted to said one drive shaft in said indoor side air flow passageway.

2. A refrigerating apparatus as claimed in claim 1, wherein said propellers are of the same size.

3. A refrigerating apparatus as claimed in claim 1, wherein said evaporator is disposed upstream of said evaporator fans with respect to the direction in which said evaporator fans force air through said indoor side air flow passageway, and said indoor side air flow passageway terminates at a blow out opening open to the freezer compartment, said blow out opening being located downstream of said evaporator fans in said direction in which the evaporator fans force air though said indoor air flow passageway.

4. A refrigerating apparatus as claimed in claim 1, wherein said main body has a front wall remote from said freezer compartment, and side walls extending from front wall to said freezer compartment, said front wall defining a pair of intake openings therethrough and at which intake openings portions of said outdoor side air flow passageway terminate, said side walls each defining an exhaust opening therethrough and at which exhaust opening a respective one of the portions of said outdoor side air flow passageway terminates, and said condenser having respective portions confronting said intake openings, respectively.

5. A refrigerating apparatus as claimed in claim 1, wherein the propellers of said evaporator fans have respective sets of blades twisted in directions opposite to one another, and the propellers of said condenser fans have respective sets of blades twisted in directions opposite to one another.

6. A refrigerating apparatus as claimed in claim 1, wherein said transmission includes a first pulley integral with said one drive shaft, and a belt extending over said first pulley.

7. A refrigerating apparatus as claimed in claim 6, and further comprising an electric motor disposed in said main body and operatively connected to said transmission to said engine so as to be driven by said engine, said electric motor having an output drive shaft, and wherein said transmission further includes a second pulley integral with the output drive shaft of said electric motor, said belt also extending over said second pulley.

* * * * *